Jan. 6, 1970  J. A. EKSTROM  3,488,084

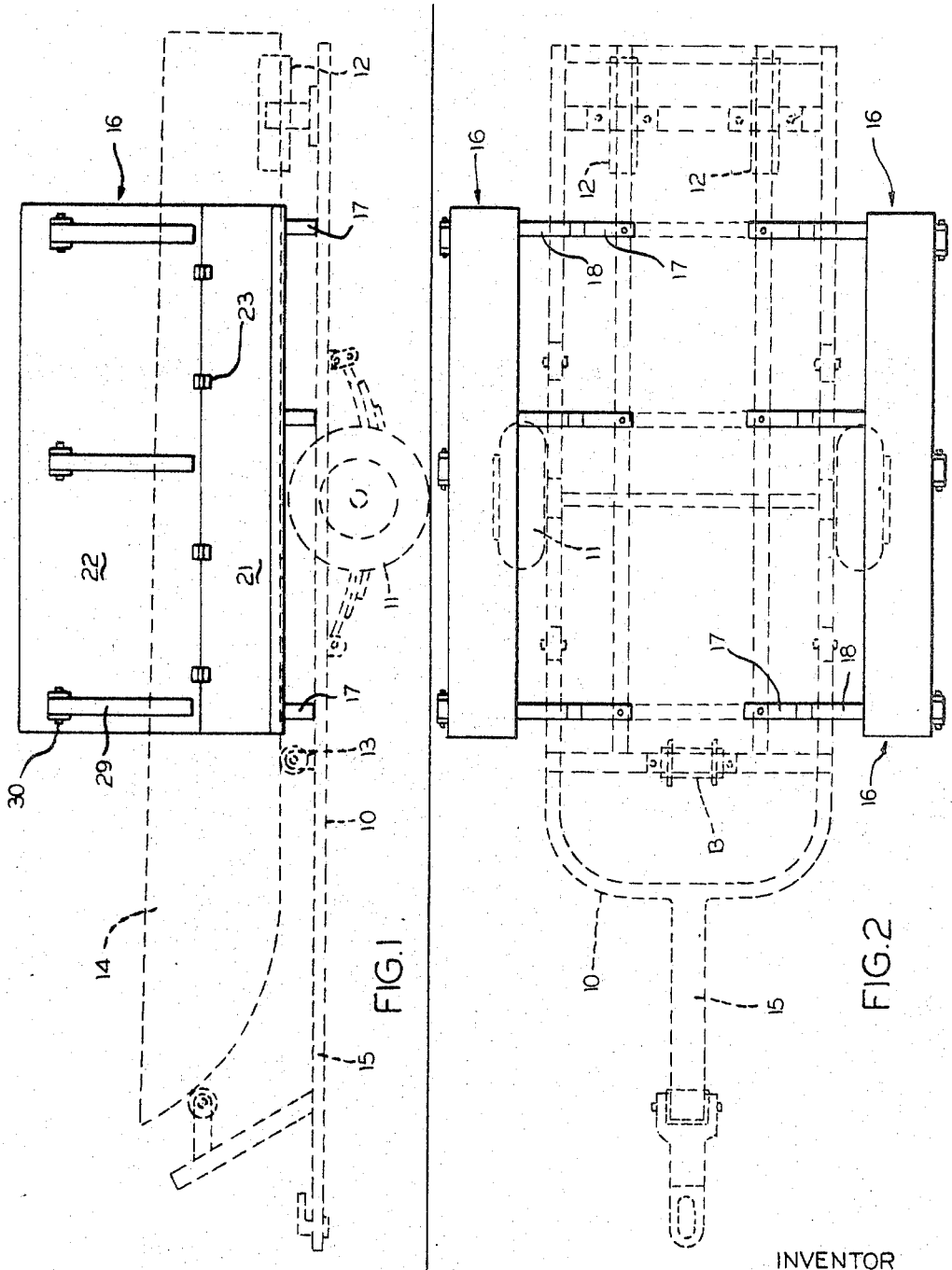

TENT UNIT FOR BOAT TRAILERS

Filed Feb. 20, 1968  3 Sheets-Sheet 2

INVENTOR
JOHN A. EKSTROM
BY Alter and Weiss
ATTORNEYS

Jan. 6, 1970  J. A. EKSTROM  3,488,084

TENT UNIT FOR BOAT TRAILERS

Filed Feb. 20, 1968  3 Sheets-Sheet 3

INVENTOR
JOHN A. EKSTROM

BY *Alton and Weise*

ATTORNEYS

United States Patent Office 3,488,084
Patented Jan. 6, 1970

3,488,084
TENT UNIT FOR BOAT TRAILERS
John A. Ekstrom, 5086 W. Maplewood Court,
Milwaukee, Wis. 53220
Filed Feb. 20, 1968, Ser. No. 706,947
Int. Cl. B60p *3/32;* A45f *1/00;* E04b *1/347*
U.S. Cl. 296—23                9 Claims

ABSTRACT OF THE DISCLOSURE

Boat trailer equipped with enclosures which can be opened to form, in conjunction with the trailer, the base of a tent. The enclosures, on opening, also provide bunks for sleeping. The enclosures, when closed, form storage units for storing the tent material and poles as well as other paraphernalia.

---

My invention relates to tent units adapted to cooperate with boat trailers, and particularly to camping enclosures for mounting onto conventional boat trailers.

It is manifest to any campers familiar with the use of a trailer for conveying a boat, that the boat and/or trailer is frequently loaded down with camping equipment such as the camper's tent. Thus, it is inconvenient to remove the boat from the trailer, or placing it thereon, due to the camping equipment and tent disposed thereon. Accordingly, it is a prime purpose of my invention to provide a device that will store the tent and accessories and make them readily accessible after removing the boat, and allowing them to be placed in position when mounting the boat without any interference or inconvenience.

The prime object of my invention is to provide boat trailers combining camping tents or enclosures.

Another object of my invention is to provide boat trailer devices of the character described, that form weather proof enclosures for the tent and accessories, which enclosures are mounted onto the trailers on both sides of the boats being conveyed on the trailers.

Still another object of the invention is to construct the enclosures so they may be hingedly adjusted to provide a platform and bunks.

A still further object of the invention is to construct the tents in a manner to permit storing the fabric constituting the tent, and the sectionally arranged supports, or rods, within the enclosures, for ease in transportation.

A further object is to provide mountings, designed in a manner so they may be attached to the surface of the trailer without mechanical changes, and without interfering with the boats being conveyed by the trailers.

The device is simple in construction, easy to manipulate, and performs the function for which it is intended.

Other and further objects of my invention will become more apparent as the description proceeds, when taken in conjunction with the drawings, in which:

FIGURE 1 is a side view of a conventional trailer and boat, shown in phantom, with the enclosures constituting my invention mounted thereon.

FIGURE 2 is a top view of a conventional boat trailer, shown in phantom, with the cabinets, or enclosures mounted thereon, parallel to one another, and on opposite sides of the trailer, to permit the boat to be disposed centrally on the trailer, between the two enclosures.

Figure 3:
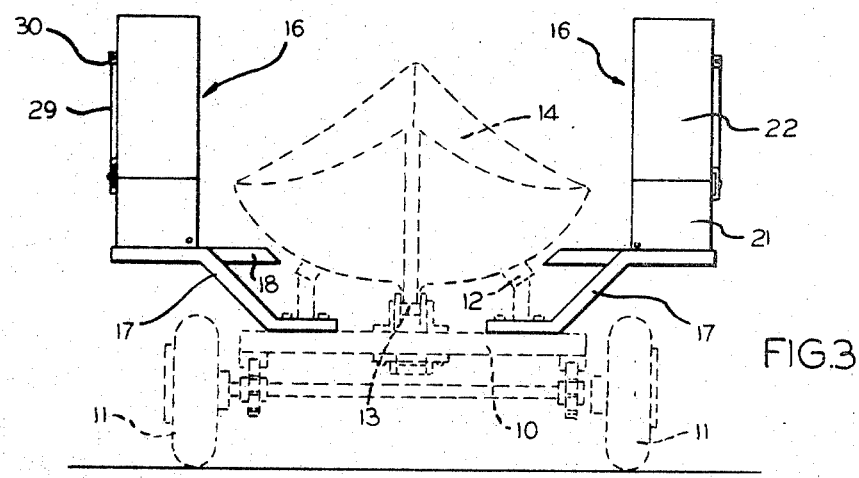
FIGURE 3 is a front view of the trailer and boat in phantom, and illustrating the method employed for mounting the enclosures onto the trailer, so the enclosures will be vertically disposed on both sides o fthe boat.

Similar characters of reference indicate corresponding parts throughout the several views, and referring now to the same, the character 10, shows generally the frame of a conventional trailer mounted on wheels 11, and equipped with rest members 12, and a roller 13, for supporting a boat generally shown as 14. The trailer is also equipped with a conventional tow-bar 15. Obviously the construction of trailers vary, in shape, size and contour.

The device constituting my invention consists of two enclosures, or cabinets, shown generally as 16, mounted onto supports 17 angularly disposed and attached to the frame structure 10 of the trailer, in any convenient and efficient manner. The angular supports 17 elevate the enclosures 16 above the wheels 11, to remove the enclosures from the space occupied by the boat and thus, to enable the boat 14 to rest on the rest members 12, and the roller 13.

Figure 4:
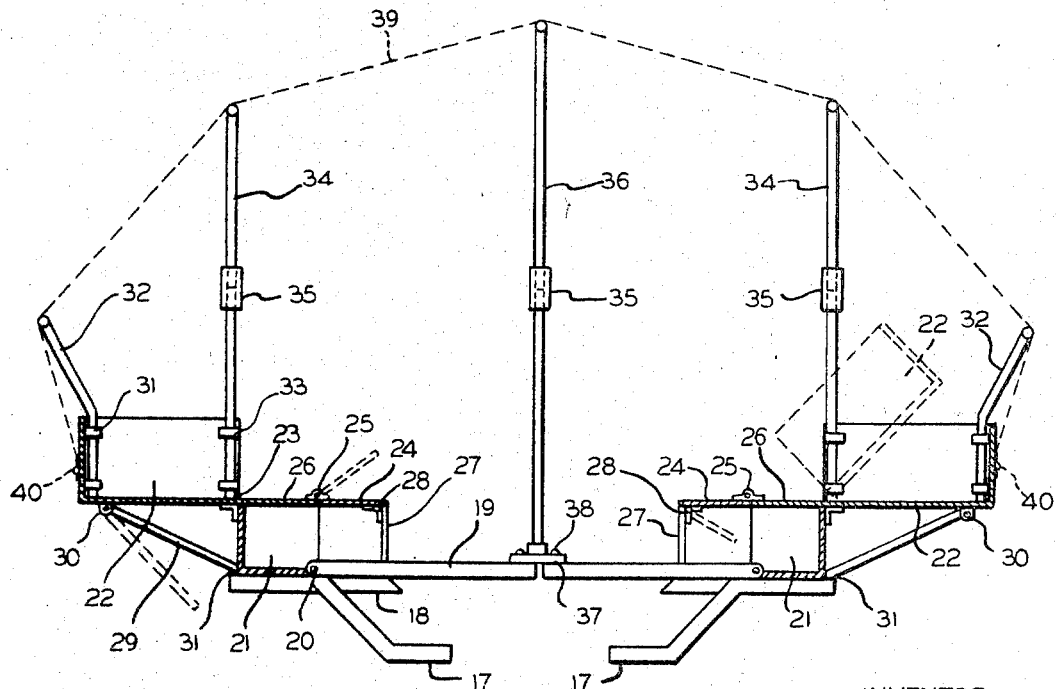
FIGURE 4 is a semi-cross sectional view of the enclosures in open position, and the fabric constituting the tent supported over the open enclosure.
Figure 5:
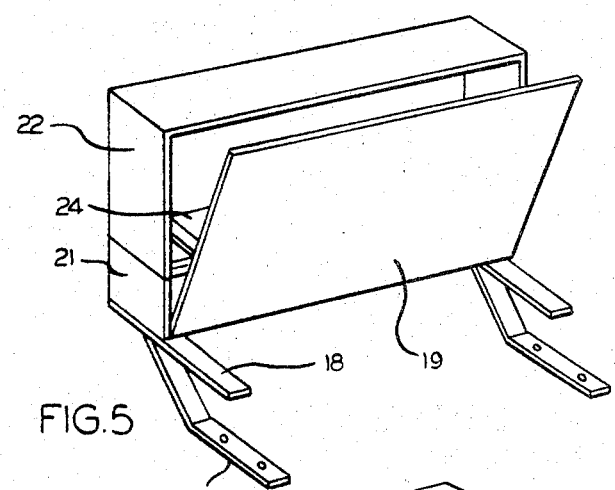
FIGURE 5 is a perspective view of one of the enclosures, about to be opened.
Figure 6:
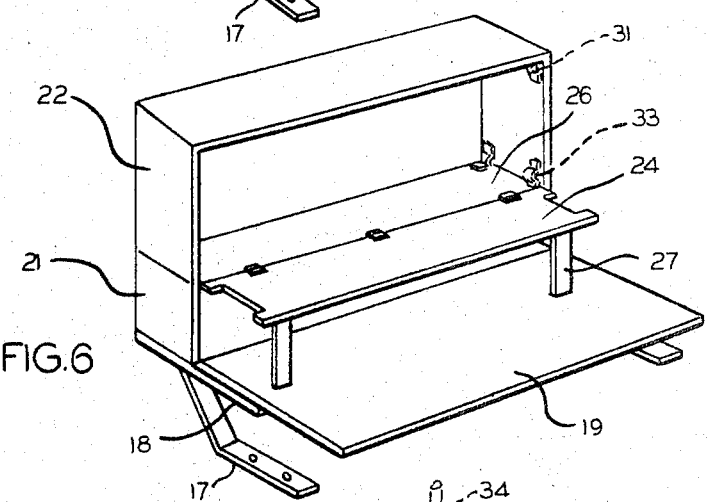
FIGURE 6 is a similar view with the cover of the enclosure folded down to form a platform, and the front portion of the bunk extending outward.

By referring to FIGS. 4, 5 and 6, it will be noted that the angular supports 17 have horizontal inwardly extending members 18 acting as supports for the surface plates 19, which form the inner covers of the enclosures (see FIGS. 4 and 6). The plates 19 are hingedly supported at 20 to the lower portions 21 of the enclosures 16, and the upper portions 22 are hingedly attached to the lower portions 21 at 23 (see FIG. 4).

There is a plate 24, hingedly supported at 25 to the surface plate 26 of the lower portion 21 (see FIG. 4), and the plate 24 is shown supported by standards 27 hingedly attached to the plate 24 at 28.

Figure 7:
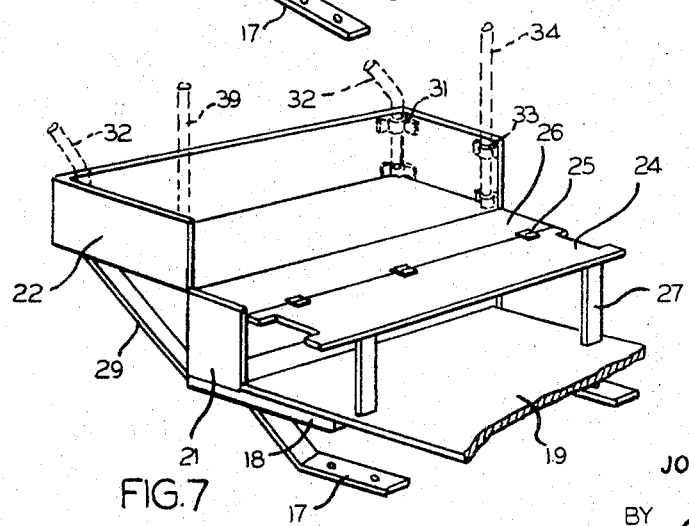
FIGURE 7 is a perspective view of one of the enclosures in an open position.

When one of the upper portions 22 is extended outwardly as shown in FIGS. 4 and 7, it is supported by brackets 29, hingedly supported at 30, and the lower end of the bracket 29 engages the supports 17 at 31 (see FIG. 4).

The inner surface of the upper portion 22 is equipped with straps 31 for supporting end rods 32, and straps 33 for supporting the intermediate rods 34.

These rods may be constructed of metal or the like, and may be solid, or tubular, and may be sectioned with engaging tubes 35, so they may be taken apart for storing within the enclosures 16. This also applies to the center support 36 which is shown equipped with the flanges 37 for resting onto the surface plates 19, and may be attached in any convenient manner to the surface plate 19, like for example pins shown as 38. All of the rods 32, 34 and 36 are arcuated at the tops thereof to act as the support for the tent material, such as canvas, or the like shown as 39. This material is supported by the rods 32, 34 and 36, and may be attached in any efficient manner at 40 to the portion 22 of the enclosures 16 as shown in FIG. 4.

From the above description it will become manifest that the device constituting my invention consists of two enclosures 16, mounted onto the boat trailer frame 10, by means of the supports 17 attached in any convenient manner, and as the portions 19, 22 and 24 are hingedly opened as shown in FIG. 4, they will provide floor boards, two bunks, all covered by canvas, or the like, which is supported by the rods 32, 34 and 36. These rods as stated may be constructed in sections so they may be stored within the enclosures, together with the canvas and any other accessories or supplies being conveyed, when the enclosures are in position as shown in FIG. 3, on both sides of the boat mounted on the trailer.

While I have shown a specific construction and arrangement of the parts and features, I am fully cognizant of that fact that many changes may be made in the parts and their arrangement without effecting the operativeness of the device, and I reserve the rights to make such changes as I may deem necessary or convenient, without departing from the spirit of my invention, or the scope of the appended claims.

Having thus described my invention, what I claim and desire to secure by Letters Patent of the United States is:

1. A tent unit for boat trailers for providing storage space and for cooperating with the trailer to provide a tent base for camping,
   said tent unit comprising a conventional boat trailer,
   a pair of enclosures, each pair vertically disposed on the opposite sides of said trailer parallel to one another,
   said enclosures having an opened position and a closed position,
   means for mounting said enclosures onto said trailer,
   said enclosures comprising upper sections and lower sections,
   pivotally connected surface plates forming a cover for said upper and lower sections when in a vertical position and a flood for said tent when in a horizontal position,
   means for supporting said surface plates in said horizontal position,
   first hinge means for moving said upper section to outwardly horizontal positions,
   pivotally connected means for supporting said upper sections in said horizontal position,
   tent pole mounting means for mounting tent poles on said upper section when said upper sections are in said horizontal positions; and
   second tent pole mounting means for mounting tent poles on said surface plates when said surface plates are in the horizontal position.

2. The tent unit for boat trailers of claim 1, wherein said means for mounting said enclosures comprise angular supports attached to said boat trailer to elevate said enclosures above the wheels of said trailer.

3. The tent unit of claim 2, wherein said means for supporting said surface plates comprise horizontal inwardly extending members associated with said angular supports, and
   wherein said surface plates are hingedly connected to the bottom of said bottom section.

4. The tent unit of claim 2, wherein said means for supporting said upper section in the horizontal position comprise brackets hingedly attached to the outside walls of said upper sections and positioned to engage said angular supports when said upper section is in the horizontal position.

5. The tent unit of claim 4, wherein said brackets are positioned to lock said upper sections in said vertical position.

6. The tent unit of claim 5, wherein bunk means are provided when said enclosures are in the opened position, said bunk means comprising a horizontal bed including the inner side wall of said upper section in cooperation with the top of said lower section.

7. The tent unit of claim 6, wherein said bunk means comprises a plate,
   hinges for connecting said plate to the top of said lower section and standards for supporting said hingedly connected plate in an extended horizontal position.

8. The tent unit of claim 7, wherein said tent poles are articulated and arcuated.

9. The tent unit of claim 8, wherein said tent pole mounting means comprise straps, and
   wherein said second tent pole mounting means comprise flanges, and
   pin means for connecting said flanges to said surface plates.

References Cited

UNITED STATES PATENTS

| | | | |
|---|---|---|---|
| 3,371,954 | 5/1968 | Larsson | 296—23 |
| 2,926,947 | 5/1960 | Green | 296—23 |
| 2,719,054 | 9/1955 | Jennings | 296—23 |

PHILIP GOODMAN, Primary Examiner

U.S. Cl. X.R

135—1